United States Patent [19]

Moisala et al.

[11] Patent Number: 4,715,877

[45] Date of Patent: Dec. 29, 1987

[54] APPARATUSES IN THE MANUFACTURE OF MINERAL WOOL

[75] Inventors: Tapio Moisala, Pargas; Jukka Gustafsson, Espoo, both of Finland

[73] Assignees: AGA Aktiebolag, Lidingo, Sweden; Oy Partek AB, Pargas, Finland

[21] Appl. No.: 902,557

[22] Filed: Sep. 2, 1986

[30] Foreign Application Priority Data

Sep. 2, 1985 [SE] Sweden .................................. 8504074

[51] Int. Cl.⁴ .............................................. C03B 37/05
[52] U.S. Cl. ............................................ 65/15; 65/19; 65/326
[58] Field of Search .................. 65/8, 15, 19, 20, 168, 65/184, 326, 12

[56] References Cited

U.S. PATENT DOCUMENTS

| | | | |
|---|---|---|---|
| 1,963,763 | 6/1934 | Smith | 65/326 X |
| 3,246,971 | 4/1966 | Rudin | 65/15 |
| 3,406,021 | 10/1968 | Day et al. | 65/1 |
| 3,841,854 | 10/1974 | Periat et al. | 65/12 |
| 4,046,541 | 9/1977 | Anderson | 65/19 |

*Primary Examiner*—Robert L. Lindsay
*Attorney, Agent, or Firm*—Pollock, Vande Sande & Priddy

[57] ABSTRACT

An apparatus for preventing the solidification and accumulation of material from the tapping jet in and on the tapping spout in the manufacture of mineral wool includes at least one oxy-fuel burner at the discharge section of the tapping spout to the spinning machine. The burner (13) is disposed at such a distance and directed such that the discharge section of the tapping spout and the first portion of the tapping jet departing from the spout are heated by the burner flame and the impulse of the burner flame is of such a size that the configuration and position of the jet will remain unaffected.

1 Claim, 2 Drawing Figures

APPARATUSES IN THE MANUFACTURE OF MINERAL WOOL

TECHNICAL FIELD

The present invention relates to an apparatus for preventing the solidification and accumulation of material from the spout jet on the tapping spout in the manufacture of mineral wool. In such a process the molten mineral in the form of a spout jet is led along one or more tapping spouts down towards a number of spinning wheels in the spinning machine. By the time the spout jet departs from that tapping spout most proximal to the spinning machine, the molten material may have cooled to such an extent that it begins to solidify. Consequently, a portion of the contents of the spout jet may be deposited in and on the discharge section, or lip, of the tapping spout. More and more material may then be accumulated on this part of the spout. This entails that the tapping spout must be regularly cleaned to remove adhering material. If the spout is not cleared of such material, an uneven jet will be obtained and, on occasions, the flow of the jet may be interrupted, which in its turn involves operational disturbance to the spinning machine, with consequentially increased water. Furthermore, production of the mineral wool will be uneven and a lower process yield will be obtained.

OBJECT OF THE PRESENT INVENTION

The object of the present invention is, therefore, to provide an apparatus by means of which the above-mentioned drawbacks may be obviated. The invention is characterised in that there is disposed, at the discharge section of the tapping spout to the spinning machine, at least one so-called oxy-fuel burner, the burner being disposed with such spacing and direction that the discharge section of the tapping spout and the first portion of the tapping jet departing from the spout are heated by the burner flame and the impulse of the burner is of such size that the configuration and position of the tapping jet will remain unaffected.

BRIEF DESCRIPTION OF THE ACCOMPANYING DRAWING

The nature of the present invention and its aspects will be more readily understood from the following brief description of the accompanying Drawing, and discussion relating thereto.

In the accompanying Drawing:

FIG. 1 illustrates the principle of a part of a plant for the manufacture of mineral wool; and FIG. 2 shows an example of a burner employed in such a plant.

DESCRIPTION OF PREFERRED EMBODIMENT

Figure 1:
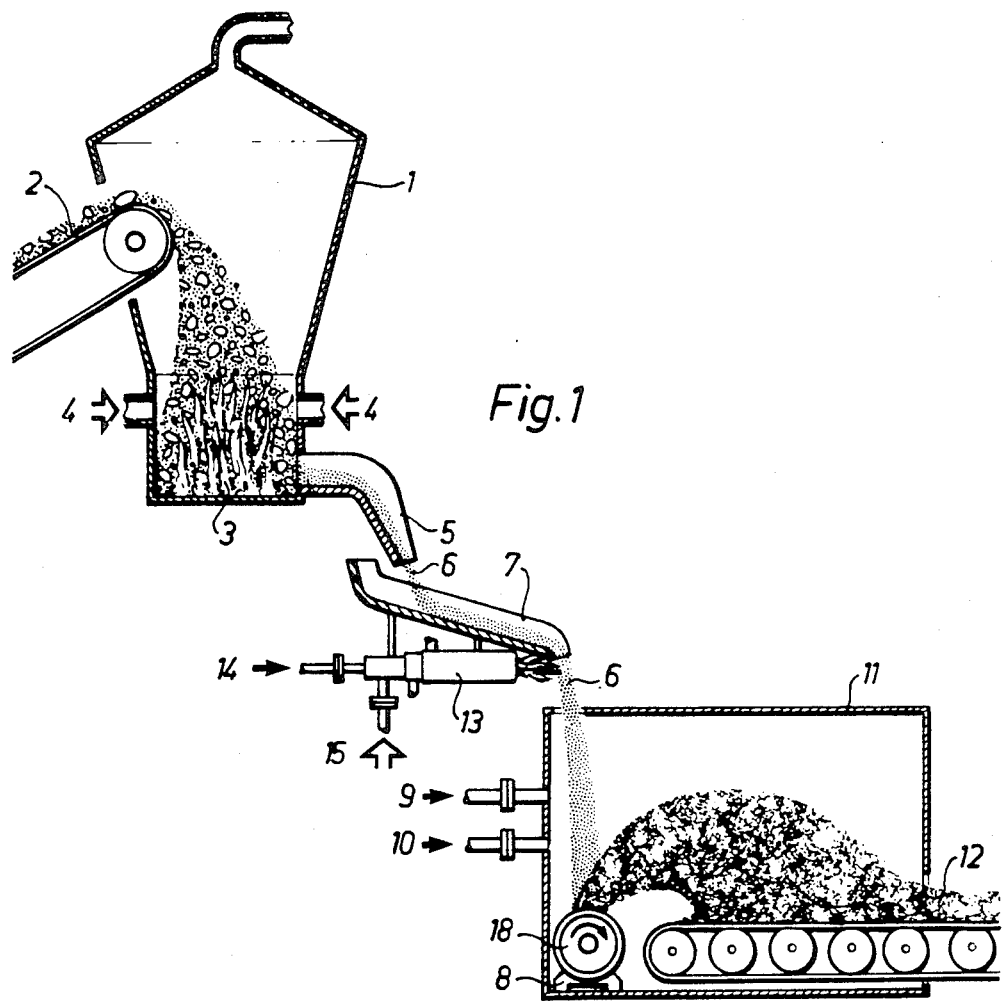

Referring to the Drawing, FIG. 1 shows a furnace 1, to which mineral material is supplied by means of a conveyor apparatus 2. This also supplies coke to the furnace and an air-blast is introduced at 4. The coke burns in the furnace—designated 3 in FIG. 1,—and melts the diabase. The melt runs through a first tapping spout 5 from which the jet 6 runs down into a second tapping spout 7. From this spout, the jet runs down into a spinning machine 8 and there impinges upon rapidly rotating spinning wheels 18. Minor amounts of plastic and oil are introduced into the spinning machine through conduits 9 and 10, respectively. In the spinning machine, the melt is converted by centrifugal force into gossamer-thin fibres. The added plastic acts as a binder and the oil renders the product dust-free and water-repellent. In the spinning drum chamber 11, the thin fibres are sucked down towards a conveyor belt on which a thick mat 12 is formed. From the spinning chamber, the mat is then conveyed further to the next stage in the manufacturing process.

Figure 2:
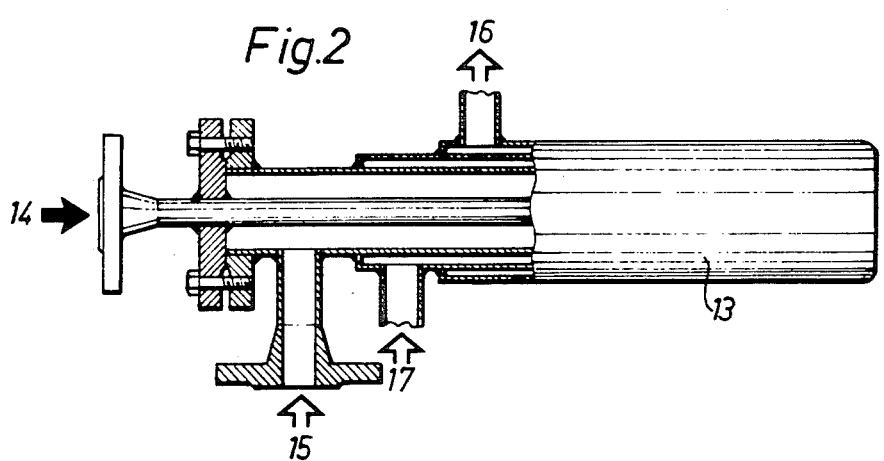

At the second tapping spout 7, there is disposed a so-called oxy-fuel burner 13. Such a burner is supplied with a fuel in liquid or gaseous form through the connection 14. Instead of combustion air pure oxygen is supplied through the connection 15. One example of an oxy-fuel burner 13 which may be employed for the purpose contemplated plated here is shown in FIG. 2. The fuel is, thus, supplied at the connection 14 and the oxygen at the connection 15. The oxygen may, for example in the nozzle, be blown out both in the centre and at the periphery. The burner is further provided with cooling jackets, coolant medium being supplied at the connection 17 and removed at the connection 16.

The burner 13 is disposed at the second tapping spout 7 at such a distance and with such a direction or orientation that the discharge section of the tapping spout and the first portion of the spout jet 6 departing from the spout 7 will be heated to such an elevated temperature that no accumulation of molten material in and on the tapping spout will take place. An oxy-fuel burner of the above-disclosed type provides precisely such an elevated combustion temperature. The burner is also highly suited for this purpose because of the slight amounts of flue gas which burners of this type generate. Moreover, the impulse of the burner flame may be kept at such a size that the configuration or position of the jet will not be affected despite the prevailing high combustion temperature. In order to obtain the best possible heating effect on both tapping spout and jet, it might be mentioned by way of example that, in the employment of propane 1.5–2.5 kg/h and oxygen 4–6 $Nm^3/h$ in the burner, the distance between the burner nozzle and jet should lie in the range of between 5 and 10 cm.

Thus, use of the apparatus described in the foregoing which includes an oxy-fuel burner, would prevent molten material in the spout jet from solidifying and accumulating in and on the tapping spout.

This entails that all cleaning work of the tapping spout may be as good as eliminated. A further advantage gained as a result of the heating provided from the oxy-fuel burner is that an even and uniform spout jet will be continually led down towards the spinning wheels in the spinning machine. This results in a more uniform and even production in the spinning operation and higher yield in the spinning process is achieved. Moreover, because of the even, continuous jet of molten material, wear on spinning wheels will be reduced, thereby extending the working life of the spinning machine.

The present invention should not be considered as restricted to that described above and shown on the Drawing, many modifications being conceivable without departing from the spirit and scope of the appended claim.

What we claim and desire to secure by Letters Patent is:

1. An apparatus for use in a mineral wool manufacturing comprising:

a furnace having an output for supply of coke and mineral material to be melted;

a first tapping spout housing an input section for receiving said molten material and a discharge section for discharging said material to an input section of a second tapping spout;
a spinning machine for receiving a tapping jet from said second spout discharge section; and
at least one oxy-fuel burner located at said discharge section of said second spout for heating with said burner's flame, said discharge section and first portion of said jet, the impulse size of said flame being predetermined to maintain unaffected the configuration and position of said tapping jet.

* * * * *